Dec. 18, 1923.  
I. BROWN  
DENTAL IMPRESSION GUIDE  
Filed June 13, 1922
1,478,019
2 Sheets-Sheet 1
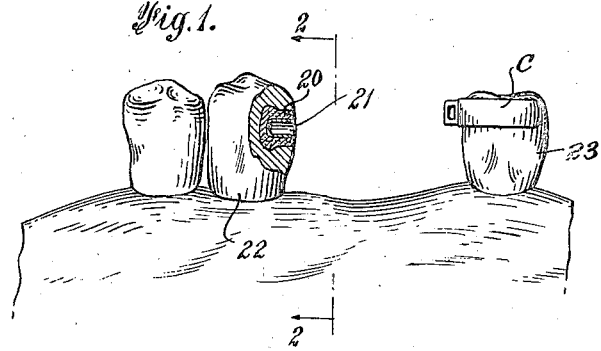
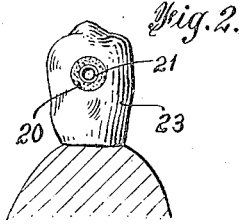
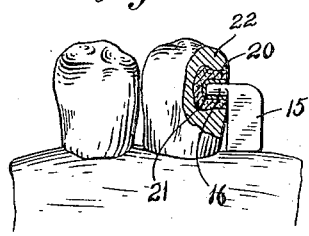
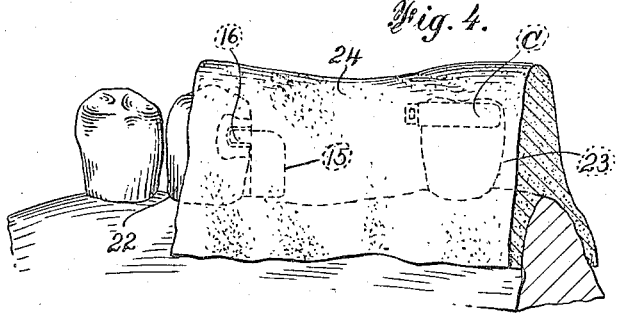
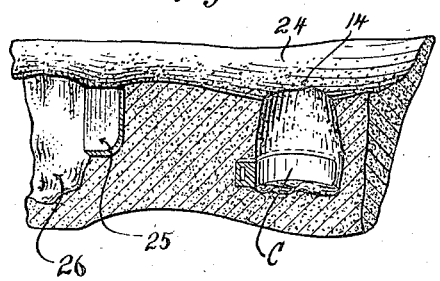
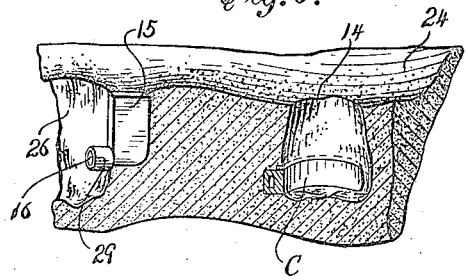
INVENTOR  
*Isaac Brown*  
BY *James C. Ledbetter*  
ATTORNEY

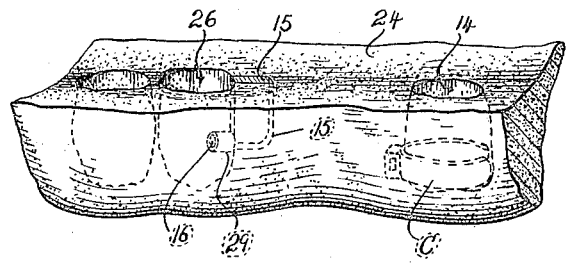
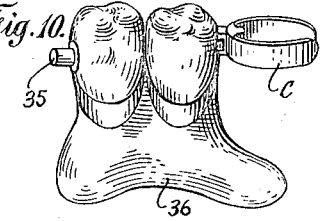
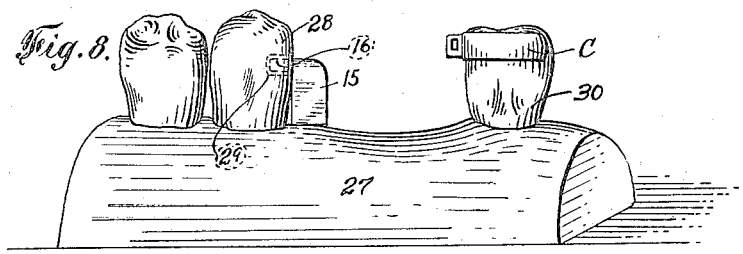
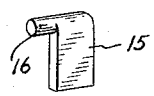

Patented Dec. 18, 1923.

1,478,019

UNITED STATES PATENT OFFICE.

ISAAC BROWN, OF NEW YORK, N. Y.

DENTAL IMPRESSION GUIDE.

Application filed June 13, 1922. Serial No. 567,952.

*To all whom it may concern:*

Be it known that I, ISAAC BROWN, a citizen of the United States, residing at New York, in the county of New York and State of New York, have invented certain new and useful Improvements in Dental Impression Guides, of which the following is a specification.

This invention relates to dentistry and especially to the production of removable bridgework, and has to do with a method and means of practicing dentistry whereby artificial bridges may be more accurately constructed with more comfort and convenience to the patient. More particularly this invention relates to an improved dental device which I prefer to call an impression guide.

Primarily the object of my invention is to disclose a method and produce a means of practicing modern dentistry and more particularly the construction of removable bridgework; the said means relating to a dental tool, device, or appliance useful as a guide in locating points of support, such as a socket or bridge pin at one end of the bridge and such as a clasp at the other bridge end whereby a bridge may be accurately constructed by a dental mechanic without recurrance to the patient's mouth for testing and fitting the bridge during the process of its construction; and the said method relating to the manner of using the dental tool which I call an impression guide.

Though, in the following description of my invention, I make use of some known procedures and methods in dental work, such as moulding and casting, I do so for the purpose of illustrating the principles of my invention and the use of my novel impression guide and for explaining the new methods of molding and casting as employed in the practice of my invention.

The accompanying drawings illustrate the manner of using my impression guide and show the construction thereof, and though there is shown a preferred manner of use and structural design of the guide or appliance itself, I claim the right of protection as to all such changes as may properly come within the scope of my invention.

The following figures in the drawings consecutively show the operations step by step whereby removable bridgework is constructed by a dental mechanic who brings the bridge to a perfect state of completion without trying or fitting it to the patient's mouth.

Figure 1 illustrates a fragmentary portion of the patient's mouth with pier teeth in the gum margin with the edentate space therebetween; and one pier tooth has a socket and the other pier tooth carries a dental clasp, both teeth having been made ready to receive plastic molding material. Figure 2 shows a front view of one pier tooth taken on the line 2—2 for the purpose of illustrating the inlay and socket constructed in the pier tooth to support a removable bridge.

Figure 3 shows the same tooth possessing the socket in the patient's mouth with the dental appliance or impression guide disposed in the socket illustrating the second step in the practice of my invention, this view being a fragmentary part of Figure 1.

Figure 4 shows the next step involving the application of plastic moulding material such as plaster of Paris, into the patient's mouth over, around, and upon the prepared pier teeth with the impression guide in position, the clasp in position, and the plastic moulding material having been worked and shaped across to fill the edentate space in the gum margin until it covers both pier teeth.

Figure 5 illustrates a fragmentary portion of the mould shown in Figure 4 after having been removed from the patient's mouth and placed in upright position, and the impressions left by the appliance or impression guide and left by the clasp are clearly observable in this figure. Figure 6 is a view similar to Figure 5, the only difference being that the impression guide has now been removed from the patient's mouth and placed in the impression cavity.

Figure 7 illustrates a full line view in perspective of the mould shown in Figures 5 and 6 and the impression guide is shown in position in the mould; and the clasp is shown held in the wall of the impression made by the clasp pier tooth.

Figure 8 is a view of a finished dummy casting or replica of the patient's tooth and gum structure made of any suitable material, such as plaster of Paris, or it is constructed of liquid artificial stone or of metal, and the impression guide is shown attached to this casting having become embedded and attached thereto when the moulded plastic material was poured into the mould Figure 7; and similarly the clasp became attached to the casting when said material was poured into the mould. The contour, occlusal surface, and general structure details of this replica or dummy casting are exact and identical in every form with the original pier teeth in the patient's mouth; and it is upon this casting as a model or base that the dental mechanic constructs the bridge Figure 10 for the patient's mouth.

Figure 9 shows a perspective view of the impression guide.

Figure 10 is a view of a removable dental bridge constructed upon the cast model Figure 8, and the dimensions of which are in exact accordance with the patient's gum margin, his pier tooth, and the socket heighth from the gum margin.

Figure 11 shows some of the denture parts used in addition to the impression guide which are supplied the trade and used in the practice of the invention.

The Figure 10, a bridge, is illustrated in closely spaced relation to the casting and exemplifies its position when removed from the casting after the bridge is completed.

An appliance, which I prefer to call an impression guide, is used in carrying out the several foregoing steps as delineated by the drawings, and after a cast model is finished upon which a mechanic may construct a bridge, then the said impression guide is discarded or thrown away inasmuch as it constitutes no part of the bridge structure or cast model structure. Having completed the cast model by the use of the impression guide which model conforms in every respect to the patient's mouth and pier teeth, the dental mechanic next builds a bridge to fit this cast model whereupon the completed bridge is in every respect a finished article ready for insertion into the patient's mouth.

A description will be given of the impression guide and reference is made to Figure 9 which shows it. The guide comprises a web or plate 15 on one end of which projects a cylindrical boss 16. The web is preferably rectangular in size and the boss is made cylindrical. Both the web and boss are manufactured sufficiently large to fulfill the requirements of the largest dental bridgework, or the impression guide may be made in several sizes whereby the dental operator selects the size most appropriate for the work at hand. The dental operator cuts off the straight end of the impression guide, cuts away a portion of the boss, or otherwise works it down to suit his needs.

After the dental operator has completed in the usual way an inlay 20 with platinum tube socket 21, he thereupon inserts the impression guide in the socket as observed in Figure 3. The dental operator next applies plaster of Paris or plastic moulding material to the patient's mouth over the two pier teeth 22 and 23, and over the impression guide, over the clasp C, and across the edentate space as is observed in Figure 4; and this mould 24 is now allowed to set and then removed from the patient's mouth and placed in upright position as illustrated in Figures 5, 6 and 7. When the mould is removed from the patient's mouth there is formed an impression guide cavity 25; and into this cavity the impression guide 15—16 is inserted with the boss 16 projecting outwardly into the pier tooth cavity 26 as observed in Figures 6 and 7; and when the mould 24 is removed from the patient's mouth the clasp C being embedded in the set plastic material is pulled off the pier tooth 23 and remains in the mold as shown in Figures 5, 6, and 7; and the pier tooth cavity 14 is formed in the mold 24 from the patient's pier tooth 23. It is to be understood that the dental operator mounts a tube 29 on the boss 16 just before he places the impression guide 15 within the cavity 25 so that the boss 16 is covered with the tube as shown in Figure 6. At this stage of the procedure the work is turned over to the dental mechanic, the patient is dismissed and not required to make a further sitting until a bridge Figure 10 is completely finished to fill the edentate space.

The dental mechanic having received the mould 24 in the condition shown in Figure 7 thereupon immediately casts a model 27 by pouring artificial stone or other suitable material into the mould Figure 7 and upon and around the impression guide and clasp; and amalgam may be used to advantage by packing it into the pier tooth mold cavities 26 and 14 so that the teeth 28 and 30 of the casting will withstand the wear and tear in building the bridge. When the mould 24 is broken and removed from the casting 27 there remains the impression guide 15 held in the position as illustrated in Figure 8 with the boss 16 and the cover tube 29 embedded in the pier tooth casting 28. The impression guide is removed and discarded leaving the tube 29 in the casting whereupon the casting 27 with the cast pier teeth 28 and 30 are an exact replica to the patient's pier teeth 22 and 23 shown in Figures 1 and 4, and the tube 29 in the casting is exactly the same size and occupies the same relative position as the socket tube 21 in the patient's pier tooth inlay. The casting 27 is an exact replica of the patient's gum margin and it follows therefore that the heighth of the socket tube 29 and clasp C above the gum margin in and on the casting 27 is exactly equal to the height above the patient's gum margin of his socket 21, and equal the height of the clasp C and its position upon the pier tooth and this being true it follows that a bridge Figure 10 built to fit the device 27 will exactly fit the patient's mouth.

The bridge shown in Figure 10 is a representation of one having been constructed upon the casting 27 to fill the edentate space so that when the said bridge is placed in the patient's mouth, the bridge pin 35 properly rests in the socket 21 with the bridge saddle 36 resting in contact with the gum ridge or margin. In a similar manner the bridge clasp C fits with exactitude the patient's pier tooth 23 because the said clasp was accurately fitted to the casting pier tooth 30.

The dental mechanic now constructs the bridge Figure 10 upon the casting 27 and so mounts the anchor pin or boss and the clasp that they accurately fit the said casting, and it follows that the bridge will then fit the patient's mouth.

Figure 12 shows some additional parts such as a high fusing platinum gold rod 40, a platinum closed bottom tube 41 having an extension part by which it is handled, a carbon rod 42, and the tube 29 which are used in the practice of my invention and the construction of the bridge Figure 10.

What I claim is:

1. That improvement in the method of laying out the position of socket and pin supports for dental bridge work, which comprises the fitting of an appliance into the patient's mouth, applying plastic material to obtain a mold possessing an impression of the appliance, removing the appliance and mold from the patient's mouth and fitting it into the mold, making a casting in the mold which casting attaches itself to the appliance, removing the appliance from the casting to leave a bridge supporting means on the casting which means is identical in lay-out and design to the patient's mouth, and constructing a bridge upon the casting and bridge supporting means.

2. That improvement in the method of laying out the position of pier teeth and bridge sockets and pins in the practice of dentistry, which involves the fitting of an impression guide to a pier tooth, making a mold of the patient's mouth of the pier tooth and of the impression guide, removing the mold and impression guide from the mouth, inserting the impression guide in the mold in such a manner that said guide projects into the pier tooth impression to attach the guide to the solidified molten material, removing the impression guide from the cast pier tooth to leave a pin socket, and constructing a bridge to fit the pin socket in the cast pier tooth.

3. That improvement in the method of laying out the position of socket and pin supports on a pier tooth and bridgework and determining the position of a clasp upon a pier tooth in the construction of dental bridges, which comprises the fitting of an appliance into the patient's mouth, fitting the clasp onto a pier tooth, applying plastic material to obtain a mold possessing an impression of the appliance and clasp, removing the mold from the patient's mouth and removing the appliance from the patient's mouth and fitting said appliance into the mold, making a casting in the mold which casting attaches itself to the appliance and clasp, removing the appliance from the casting to leave a bridge supporting means on the casting which means is identical in lay-out and design to the patient's mouth, and constructing a bridge upon the casting between the bridge supporting means and the clasp.

4. A device useful in the construction of dental bridgework comprising a web to form an impression in a mold, and a boss on the web to fit into a pier tooth socket, and the combination of a pier tooth provided with a socket to receive the boss.

5. An impression guide useful in dental bridgework comprising a web, a boss on the web, and a tube on the boss adapted to slip off the boss and remain as a lining in the socket of a dummy upon which is to be made and fitted a removable bridge to be subsequently installed in the patient's mouth.

6. An impression guide comprising a rectangular plate, and a boss made on one end of the plate, said boss being adapted to form a socket in a cast dummy upon which bridgework is constructed.

7. An impression guide in the nature of a tool and useful in constructing a dental bridge after which it is discarded, comprising means such as a plate for forming an open impression in plastic molding material, and a boss made on the means by which the tool may be supported in the socket of a natural tooth while impression material is applied to the mouth, said boss also adapted to form a hole in a dummy device.

In testimony whereof I affix my signature this 3d day of June, 1922, in the city of New York, State of New York, and county of New York.

ISAAC BROWN.